(12) United States Patent
Chisnell

(10) Patent No.: US 7,407,165 B1
(45) Date of Patent: Aug. 5, 2008

(54) COMPOSITE SLEEVE FOR SEALING A TUBULAR COUPLING

(75) Inventor: Jerry H. Chisnell, Northville, MI (US)

(73) Assignee: Hutchinson FTS, Inc., Troy, MI (US)

( * ) Notice: Subject to any disclaimer, the term of this patent is extended or adjusted under 35 U.S.C. 154(b) by 0 days.

(21) Appl. No.: 09/542,897

(22) Filed: Apr. 4, 2000

(51) Int. Cl.
*F16L 21/05* (2006.01)
*F16L 5/02* (2006.01)
*F16L 17/00* (2006.01)

(52) U.S. Cl. ............... 277/603; 277/607; 277/612; 277/615; 277/616; 277/626; 285/351

(58) Field of Classification Search ............. 277/602, 277/603, 336, 342, 627, 650, 612, 607, 615–616, 277/626, 628; 285/351, 918
See application file for complete search history.

(56) References Cited

U.S. PATENT DOCUMENTS

| | | | | |
|---|---|---|---|---|
| 634,848 | A | * 10/1899 | Courson | 138/DIG. 6 |
| 2,674,956 | A | * 4/1954 | Hilton | 277/336 |
| 2,691,536 | A | * 10/1954 | Tamminga | 277/624 |
| 2,743,780 | A | * 5/1956 | Brown | 166/120 |
| 2,809,060 | A | * 10/1957 | Thompson | 277/640 |
| 3,320,004 | A | * 5/1967 | Garrett | 175/325.5 |
| 3,385,367 | A | * 5/1968 | Kollsman | 166/191 |
| 3,398,654 | A | * 8/1968 | Waldrop | 277/335 |
| 3,770,181 | A | * 11/1973 | Stahl | 277/404 |
| 4,055,359 | A | 10/1977 | McWethy | |
| 4,078,810 | A | * 3/1978 | Arendt | 166/153 |
| 4,213,619 | A | * 7/1980 | Arlt et al. | 277/607 |
| 4,240,473 | A | * 12/1980 | Leonard | 141/312 |
| 4,262,166 | A | 4/1981 | Radzishevsky et al. | |
| 4,407,532 | A | 10/1983 | Patel et al. | |
| 4,426,095 | A | * 1/1984 | Buttner | 277/606 |
| 4,535,996 | A | 8/1985 | Cardis et al. | |
| 4,690,435 | A | 9/1987 | Manning et al. | |
| 4,715,624 | A | * 12/1987 | Frye | 285/148.13 |
| 4,721,021 | A | 1/1988 | Kusznir | |
| 4,781,400 | A | 11/1988 | Cunningham | |
| 4,991,882 | A | * 2/1991 | Gahwiler | 285/331 |
| 5,044,671 | A | 9/1991 | Chisnell et al. | |
| 5,054,154 | A | 10/1991 | Schiffer et al. | |
| 5,096,231 | A | 3/1992 | Chisnell et al. | |
| 5,121,932 | A | 6/1992 | Goldman et al. | |
| 5,228,721 | A | 7/1993 | Whittle et al. | |
| 5,348,779 | A | 9/1994 | Igarashi | |
| 5,355,961 | A | * 10/1994 | Gariepy et al. | 166/387 |
| 5,425,557 | A | * 6/1995 | Bartholomew | 285/242 |

(Continued)

FOREIGN PATENT DOCUMENTS

FR    2740526 A1    4/1997

(Continued)

*Primary Examiner*—Vishal Patel
(74) *Attorney, Agent, or Firm*—VanOphem & VanOphem, P.C.

(57) ABSTRACT

A composite sleeve seal for sealing a conduit connection including a body portion having collar sections spaced apart from one another to define gaps therebetween, and being interconnected to one another by link segments spanning the gaps. A seal portion interposes the collar sections in the gaps and surrounds the link segments to positively interlock the seal portion with the body portion to form the composite sleeve seal as one integral component.

6 Claims, 2 Drawing Sheets

U.S. PATENT DOCUMENTS

| | | | | |
|---|---|---|---|---|
| 5,456,314 | A * | 10/1995 | Boehm et al. | 166/208 |
| 5,618,047 | A | 4/1997 | Belter | |
| 5,630,244 | A | 5/1997 | Chang | |
| 5,653,475 | A * | 8/1997 | Scheyhing et al. | 285/305 |
| 5,687,975 | A * | 11/1997 | Inciong | 277/591 |
| 5,761,759 | A | 6/1998 | Leversby et al. | |
| 5,879,033 | A * | 3/1999 | Hansel et al. | 285/239 |
| 5,927,725 | A * | 7/1999 | Tabata et al. | 174/152 G |
| 5,941,576 | A * | 8/1999 | Krausz | 285/110 |
| 5,944,319 | A * | 8/1999 | Kohlman | 277/314 |
| 5,950,381 | A * | 9/1999 | Stansbie | 16/2.2 |
| 6,003,873 | A * | 12/1999 | Solberg | 277/323 |
| 6,032,958 | A * | 3/2000 | Fowler | 277/337 |
| 6,059,338 | A * | 5/2000 | Diederichs | 285/370 |
| 6,106,030 | A * | 8/2000 | Nader et al. | 285/368 |
| 6,260,851 | B1 * | 7/2001 | Baron | 277/603 |

FOREIGN PATENT DOCUMENTS

WO      WO97/16670    *   5/1997

* cited by examiner

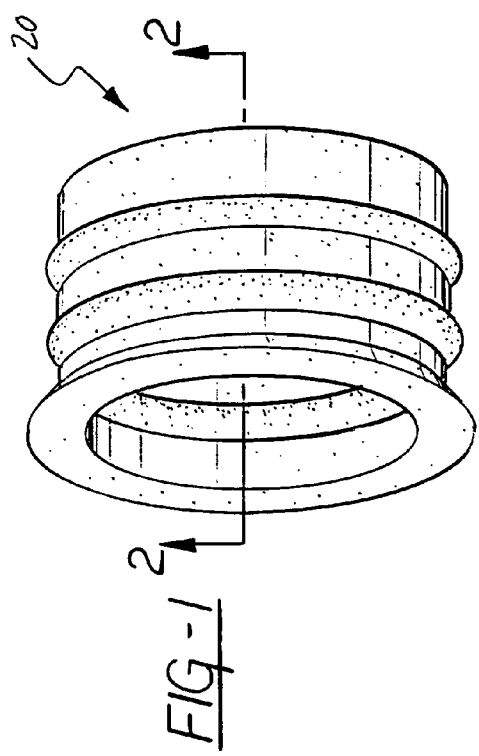
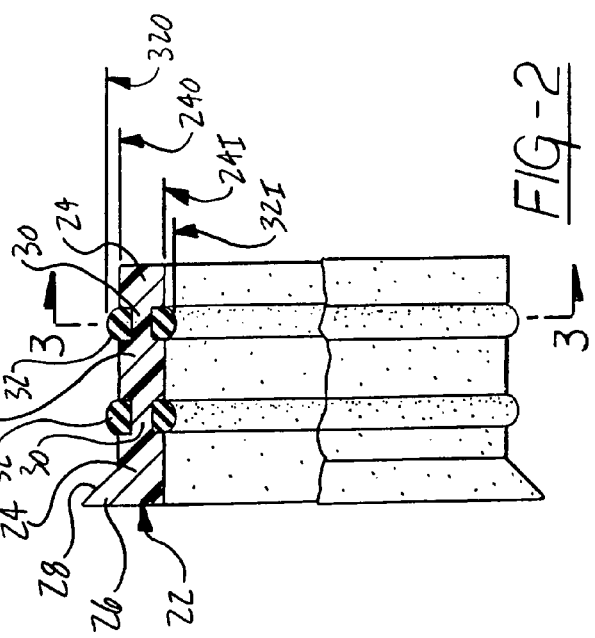
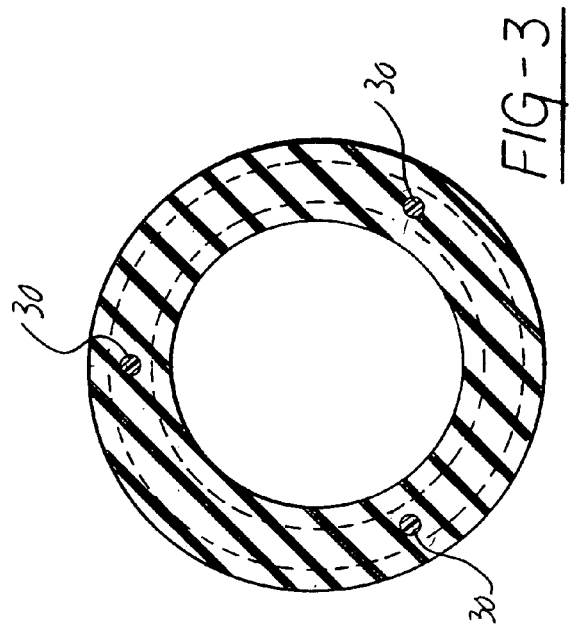

COMPOSITE SLEEVE FOR SEALING A TUBULAR COUPLING

BACKGROUND OF THE INVENTION

1. Field of the Invention

The present invention relates in general to conduit connections for fluid systems. More particularly, the present invention relates to a composite sleeve seal for a fluid-tight conduit connection between male and female tubular members of an automobile air-conditioning system.

2. Description of the Prior Art

In conventional tubular couplings, standard O-rings are used to seal the connection between tubular members. The O-rings are seated in grooves in a male or female tubular member and are compressed by a complementary female or male tubular member, thereby sealing the connection. The O-ring grooves are generally machined or formed into one of the tubular members as part of a tube end-forming step in the manufacturing process. Performing this step involves extensive process cycle time and total piece costs.

U.S. Pat. No. 4,055,359 to McWethy is an example of the prior art tubular coupling described above. The '359 patent discloses a plurality of O-rings that are compressed in sealed grooves to prevent the coupling from leaking. The O-rings are accommodated by forming spaced circular grooves in the tubular wall of the inner tube.

Alternatively, U.S. Pat. No. 4,690,435 to Manning et al. teaches a hose coupling that is sealed by crimping an outer sleeve over an inner sleeve, compressing and sealing a hose therebetween. The outer sleeve has four axially spaced rings and is crimped at each axially spaced ring creating four annular seals between the hose and the inner sleeve.

Likewise, U.S. Pat. No. 4,407,532 to Patel et al. and U.S. Pat. No. 5,228,721 to Whittle et al. each disclose a crimped connection that enhances sealing by providing ridges or serrations on the outer surface of the inner sleeve, thereby engaging and sealing the hose. For example, the '532 patent discloses a collar having a plurality of barbs on its inner surface and an insert member having a plurality of closely spaced annular ridges for gripping and sealing a hose member. The plurality of barbs on the inner surface of the collar defines a relationship with the plurality of spaced annular ridges on the outer surface of the insert member to provide crimping of the sleeve onto the hose. After crimping the collar about the insert member, with the hose compressed therebetween, the hose is sealingly engaged between the plurality of grooves and the annular ridges in the collar.

The '721 patent discloses a similar arrangement in which the coupling includes a spigot having one or more circumferentially extending ribs for engagement with the inner surface of the pipe member. A shoulder, from which the spigot extends, is coaxially spaced from the spigot with a resilient sleeve therebetween. A crimp ring is slidably mounted over the sleeve for crimpable attachment to the fitting. The circumferentially extending ribs are forced into sealing engagement with the pipe wall and the resilient sleeve ensures the pipe is not damaged. The spigot is either copper or plastic.

U.S. Pat. Nos. 5,044,671 and 5,096,231 to Chisnell et al. disclose a coupling that incorporates an O-ring or resilient sealing member in conjunction with a crimped connection. The '671 reference discloses a hose having an inner liner of thermoplastic material wherein the hose is maintained in compression by a swaged sleeve over a fitting having an O-ring or resilient sealing member located in one of a plurality of grooves into which the thermoplastic liner is cold-formed. The O-ring minimizes the flow of the inner liner at elevated operating temperatures and maintains a seal under varying operating conditions. The '231 reference discloses a resilient sealing member provided on the outer periphery of the fitting to sealingly engage a hose member and provide a seal therebetween.

Each of the above references provides a sealing arrangement that adequately seals a coupling. However, all of the couplings described above require extensive tube end-forming operations to create the grooves that contain the resilient sealing members, or the ridges and circumferentially extending ribs that sealingly engage a hose member.

Furthermore, O-rings are known to be relatively unreliable and subject to failure over time. O-rings provide a good seal when they are at 6% compression. Due to tolerance stack up of the machined groove, the O-ring, and the tubular members, the range of O-ring compression is between 2% and 15%. If the compression is less than 6%, leaks will occur. Alternatively, if the compression is over 15%, several other problems will occur, including: 1) the coupling becomes extremely difficult to assemble over the O-ring; 2) the O-rings undergo considerable deformation during the coupling process; 3) the life of the O-ring becomes substantially reduced when subjected to high heat; and 4) the O-rings easily become nicked or otherwise damaged resulting in premature failure and poor sealing ability, thereby causing leaks. Thus, there is a need for a more reliable and longer lasting seal for tubular couplings.

Conventional tube end-forming operations are also relatively difficult processes to control. The tube wall is thickened by a punching operation that compresses a length of tube. The punching operation is not very repeatable, as it is very material dependent, and results in a large range of dimensional tolerances for the finished product. After the tube wall is thickened the O-ring grooves are cut into the thickened end of the tube. During the cutting operation the tube is held a certain distance from the thickened end, which permits flexing in the tube, resulting in uneven cuts. Also, the particles or chips left behind in an uneven cut can cut the O-ring and lead to premature failure thereof. In sum, poor surface finish and chips resulting from conventional tube end-forming contribute to the O-ring sealing surfaces being unacceptable for proper sealing.

Another problem with conventional tube end-forming processes is side loading that can occur when the tubular connection is torqued. When the connection is torqued, the O-ring can become pinched in one area and decompressed in another area. The decompressed area of the O-ring becomes a leak path. Additionally, under side load conditions the O-ring is assured of failing when subjected to the harsh pressure, temperature, and vibration conditions of a vehicular air-conditioning system.

One attempt at eliminating such end-forming operations was disclosed in U.S. Pat. No. 4,781,400 to Cunningham. The Cunningham reference teaches a quick connect tube coupling using a two-piece tubular seal member placed over a male member for providing the effect of two O-rings, without requiring any special end-forming operation. Cunningham discloses the tubular seal member including a metal tubular member having a rubber material molded onto one end thereof. The tubular seal member is sandwiched between a male tubular member and a female tubular member. The rubber material includes inwardly extending beads and an axial portion for sealing axially against the female tubular member and for sealing radially against the male tubular member.

While the Cunningham reference enables elimination of end-forming requirements for tubular connections, it has a few drawbacks. For example, the rubber material is not positively interlocked with the underlying metal tubular member and therefore may more easily become separated therefrom. Additionally, the rubber material seals only axially, and radially inwardly, which is quite unlike how traditional O-rings seal. Traditional O-rings seal both radially inwardly and outwardly, and thereby better center the male tubular fitting within the female fitting. Accordingly, with Cunningham there is no continuity of the rubber sealing surface from a radial surface on the male tubular fitting to a radial surface in the female tubular fitting.

Another attempt at eliminating end-forming operations was disclosed in French Patent 2,740,526 to Baron. The Baron reference teaches use of a composite gasket of alternating collars and rings to be circumferentially disposed about the end of a tube within a tubular connection. The Baron reference discloses rigid collars in the shape of cylindrical sleeves that alternate coaxially with elastomer rings to define the gasket. The collars are integrally fixed to the rings by a gluing, casting, or vulcanizing process.

While the Baron reference represents another approach to eliminating end-forming operations, it also has several drawbacks. First, each alternating collar and ring must be individually manufactured, resulting in an abundance of individual parts to be made and handled. Second, each individual collar or ring must be assembled to one another, representing more manufacturing steps and cost. Third, each alternating collar and ring must be fused together, thus resulting in still more manufacturing steps. Fourth, due to the harsh environment in which such gaskets are used, a fused connection between the collars and rings may separate. Consequently, the manufacture of the gasket is relatively time consuming and expensive, while performance of such a fused thermoplastic in a demanding environment is not well established.

Prior art tube end-forming operations are time consuming and therefore expensive. Generally, what is needed is a simplified means for sealing a coupling that does not require separate O-rings mounted in machined or formed grooves. The extensive tube end-forming operations, such as machining grooves, or forming circumferentially extending ribs, need to be eliminated to reduce cost. Accordingly, what is needed is a fluid-tight conduit connection that requires neither extensive tube nor seal manufacturing operations and will enhance the sealing capability of a tubular coupling.

SUMMARY OF THE INVENTION

The present invention overcomes the above-mentioned drawbacks associated with prior art sealing couplings by introducing a composite intermediate sleeve that is mounted over a male tube end, and is received by a female tube end. The composite sleeve seal is a molded, sectioned collar having spaced apart seal portions that are contiguous with the collar sections and are positively interlocked with the collar sections.

Provided in the present invention is a composite sleeve seal for sealing a conduit connection, including a body portion having annular collar sections spaced apart from one another to define gaps therebetween. The annular collar sections are interconnected by link segments spanning the gaps. A seal portion is interposed the collar sections in the gaps and surrounds the link segments to interlock the seal portion with the body portion to form the composite sleeve seal as an integral component.

The collar sections are made of a high temperature plastic and the seal portions are made of a high temperature rubber or other material capable of being compressed between the collar sections to create a seal therebetween. The seal portions are compressed between male and female components, thereby creating a seal.

In conventional fittings, the male component has a set of grooves containing O-rings that are compressed by the female component to create a seal. With the present invention, neither the male component nor the female component has O-rings or O-ring grooves. There are no O-rings, machined grooves, ridges, or ribs on either the male component or the female component. Instead, the composite sleeve of the present invention is positioned between the male tubular member and the female tubular member, thereby creating a seal. Therefore, no time consuming, costly tube end-forming processes are necessary in order to make O-ring grooves. Without machined grooves, the tube end-forming process is a much simpler and more controllable manufacturing process, resulting in a higher quality product.

It is an object of the present invention to provide an enhanced seal for a tubular coupling.

It is another object of the present invention to eliminate the tolerance stack up associated with conventional O-ring containment and compression methods that create leak paths.

It is yet another object of the present invention to avoid complex and costly machining and tube end-forming processes associated with conventional tubular couplings and associated O-ring grooves.

It is a further object of the present invention to provide a one-piece segmented composite sleeve that is mounted between adjacent ends of adjoining tube members so as to create a seal between the tubular members of a tubular coupling.

It is still a further object of the present invention to provide a segmented composite sleeve having collar sections alternating with circumferentially protruding members for engaging and sealing tubular members of a tubular coupling that is a molded component wherein the collar sections are positively interlocked with the annular protrusions during molding.

It is yet a further object of the present invention to provide a segmented composite sleeve having plastic collar sections alternating with high temperature resilient material annular protrusions for engaging and sealing tubular members of a tubular coupling.

Further objects, features and advantages of the invention will become more apparent from a review of the brief description of the figures taken in conjunction with a detailed description of the preferred embodiment that follows.

BRIEF DESCRIPTION OF THE DRAWINGS

FIG. 1 is a perspective view of the composite sleeve of the present invention;

FIG. 2 is a partial cross-sectional view of the composite sleeve of FIG. 1 along line 2-2;

FIG. 3 is a cross-sectional view of the composite sleeve of FIG. 2 taken along line 3-3;

DETAILED DESCRIPTION OF THE PREFERRED EMBODIMENT

Figures 4, 5:
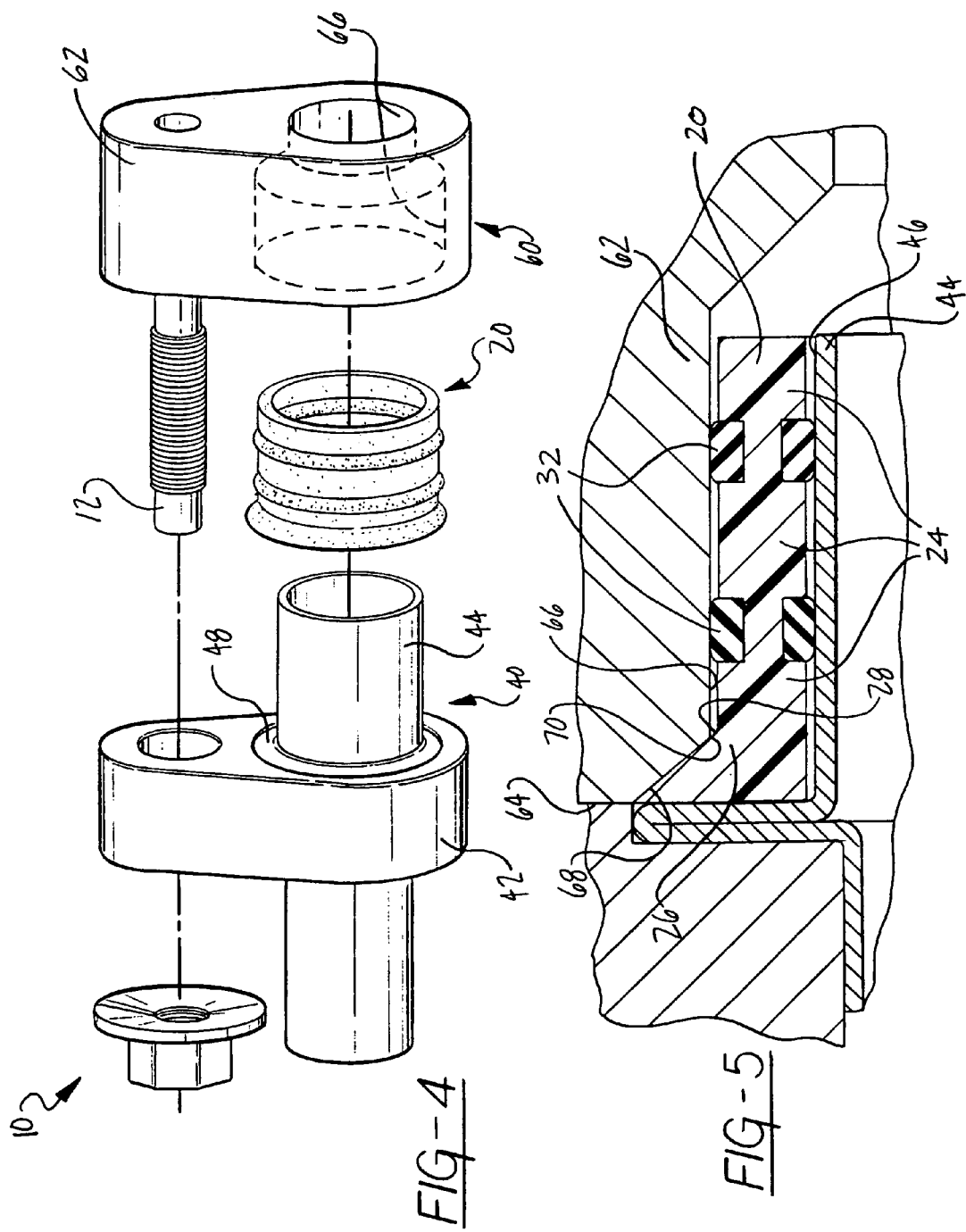
FIG. 4 is an exploded perspective view illustrating the composite sleeve of the present invention interposed male and female portions of a block connection.
FIG. 5 is a cross-sectional view illustrating an assembled block connection with the composite sleeve of the present invention.

Referring to the Figures, and particularly to FIG. 1 there is shown a composite sleeve seal 20 according to the preferred embodiment of the present invention. As shown in FIG. 2, the composite sleeve seal 20 is made up of a body portion 22 having spaced apart collar sections 24 that are annular or ring-like in form. The collar sections 24 are preferably composed of a plastic material such as nylon, but may also be composed of a metal or composite material. One of the collar sections 24 may also have a tapered portion 26 having a tapered surface 28. The collar sections 24 have a common inside diameter 24I and outside diameter 24O. The collar sections 24 are interconnected by three link segments 30 between each collar section 24. As shown in FIG. 3, the link segments 30 are circumferentially equally spaced apart, and extend axially from the collar sections 24. According to FIG. 2, the link segments 30 are integral with each of the collar sections 24 with which they connect such that the entire body portion 22 is constructed of one continuous material. The collar sections 24, finally, are contiguous with seal portions 32 that are also annular or ring-like in form. The seal portions 32 interpose the collar sections 24 and surround the link segments 30, such that the seal portions 32 are positively interlocked with the body portion 22.

The seal portions 32 are preferably made of high temperature rubber such as HNBR or nitrile, or may be made of any other suitable material that can withstand high temperatures, yet remain pliable and flexible to create a seal. The seal portions 32 have a major diameter 32O that exceeds the common outside diameter 24O of the body portion 22, and have a minor diameter 32I subordinate of the common inside diameter 24I of the body portion 22. The seal portions 32 are preferably contiguous with the collar sections 24 of the body portion 22 and in this instance are sandwiched therebetween. However, axial clearance may be provided between the seal portions 32 and the collar sections 24 if desired. The seal portions 32 are not, but may be fused to the body portion 22 if desired, by a polymer adhesive or by a thermal fusing process.

Here, preferably, the seal portions 32 are mechanically interlocked with the body portion 22. The seal portions 32 are molded in place to the body portion 22, as will be discussed more in detail below. Each seal portion 32 is interposed the collar sections 24 and surrounds each link segment 30 such that the link segments 30 penetrate the seal portions 32, here in three places, to integrate the body portion 22 and seal portions 32 of the composite sleeve seal 20. Any combination of collar sections 24 and seal portions 32 is possible and the number and order of the components is dependent upon the application. At a minimum at least one collar section 24 is contiguous with at least one seal portion 32.

Presently known to one of ordinary skill in the art is a process for molding and interlocking rubber to a more rigid base material, such as metal or plastic. In general, this is a molding process that is commonly referred to as encapsulation or potting, in which a first component is encased or impregnated with a second component of free flowing material that is subsequently hardened in place. Specifically, this process is now routinely used to make common items such as: plastic or metal gaskets having molded-in rubber eyelets; rubber pistons molded over steel substrate; and plastic bodied toothbrushes or pens with molded-in rubber finger grips. Examples of such items and related manufacturing methods are disclosed in U.S. Pat. Nos. 5,761,759 and 5,618,047.

Using such a process, the seal portions 32 are molded together with the collar sections 24 to form the sleeve seal 20. Accordingly, the method here would involve producing the body portion 22 including the annular collar sections 24 that have the link segments 30 extending therefrom. The body portion 22 could be produced by a molding operation if plastic, or a stamping or casting operation if metal. The body portion 22 is then placed in a mold cavity having voids to accept the body portion 22 and voids to accept the seal portion 32. After the mold is closed, the seal portion 32 is then injected into the voids of the mold cavity not occupied by the body portion 22. Thus, the seal portion 32 is molded contiguous with the collar sections 24 and around the link segments 30 for interlocking the seal portion 32 and body portion 22, to integrate the composite sleeve seal 20 as one integral component. After the seal portion 32 has cured, the mold is opened allowing removal of the finished composite sleeve seal 20.

As best shown in FIG. 4, the composite sleeve seal 20 according to the present invention is shown in a typical conduit block connection 10. The composite sleeve seal 20 of the present invention is suitable for a variety of tube end-forming applications, such as the conduit block connection 10, or a spring-lock coupling (not shown). The conduit block connection 10 embodies a male block assembly 40, a female block assembly 60, and the composite sleeve seal 20. The composite sleeve seal 20 is adapted to surround and engage a male tube 44 that is held to a male connecting block 42 by a roll formed annular upset bead 48. The conduit block connection 10 also includes the female block assembly 60 including a threaded stud 12 threaded into a female connecting block 62. The female connecting block 62 includes a throughbore 66 into which the male tube 44 and composite sleeve seal 20 locate upon assembly of the conduit block connection 10.

As shown in FIG. 5, the male tube 44 and composite sleeve seal 20 locate within the throughbore 66 of the female connecting block 62. The composite sleeve seal 20 circumscribes the male tube 44 such that the composite sleeve seal 20 is disposed between the male tube 44 and the throughbore 66 of the female connecting block 62. The seal portions 32 are radially compressed between the male tube 44 and female connecting block 62 and axially restrained by the collar sections 24 to form the fluid-tight seal. This results in a continuous annular rubber sealing surface from an outer diameter 46 of the male tube 44 to the inner diameter of the throughbore 66 of the female connecting block 62, thus establishing a primary seal.

A secondary seal is established by the tapered portion 26 of the composite sleeve seal 20. The female connecting block 62 further includes a mounting surface 64, and includes the throughbore 66 extending through the female connecting block 62. The throughbore 66 includes a chamfer 68 in the mounting surface 64 where the chamfer 68 and throughbore 66 define a transition surface 70 therebetween. The transition surface 70 is essentially a ring formed from an annulus of intersecting points formed at the intersection of the chamfer 68 and throughbore 66. The tapered surface 28 of the tapered portion 26 of the composite sleeve seal 20 locates against the transition surface 70 of the female connecting block 62 such that the transition surface 70 engages in annular line contact against the tapered surface 28 to create a secondary seal of the fluid-tight conduit block connection 10. This, in effect, forces the components on center thereby avoiding side load types of failures.

From the above, it can be appreciated that a significant advantage of the present invention is the sleeve seal is capable of accommodating dimensional variations in the outer diameter of the male tubular member without affecting the quality and durability of the seal, because the seal portions are flexible and compress. Additionally, unlike machined grooves that accept O-rings, here the tolerance stack ups do not affect the seal that is created by the sleeve seal of the present invention.

Another advantage is that in conventional couplings, the inner diameter of the female tubular member, the width, depth, and symmetry of the O-ring groove, and the O-ring diameter all contribute to the tolerance stack ups affecting the coupling seal. In the present invention, the tolerance stack ups are much easier to control. The dimensions of the sleeve seal can be held to closer tolerances. Thus, the tolerance considerations of the O-ring grooves of typical tube ends are not a factor.

Yet another advantage is that the end-forming process for the present invention is significantly simplified over the processing that is required for a conventional block connection fitting. Conventional end-form processing requires a relatively long bearing surface on the male tube to roll the grooves. With the present invention, there are no grooves, ridges, or protrusions to be machined or formed in the male tubular member. Furthermore, the sleeve seal represents a one-piece component that is easily and quickly slipped over a male tube for assembly. Consequently, the block connection of the present invention is less expensive, more easily assembled, and more compact than those of the prior art.

An additional advantage is that there is no need for O-ring sealing members. In conventional block connection fittings, O-rings are designed to compress approximately 6% to create a seal. Instead, a combination of the manufacturing variations in machining the O-ring grooves, slight manufacturing variations in the male tubular member and slight manufacturing variances in the female tubular member may result in a tolerance range of 2-15%. A tolerance of 2% is significantly below the ideal 6% compression for an O-ring seal which results in the O-rings being damaged during assembly, and leads to premature failure and leaks. Likewise, any tolerance over 6% would not compress the O-rings at all, resulting in leaks. The sleeve seal of the present invention is capable of compensating the 2-15% tolerance range and beyond, thereby enhancing the life span and quality of the seal.

Still another advantage is that the elimination of complex tube end-forming processes eliminates the potential for O-ring contamination by particles left behind in O-ring grooves. The problem of side load defects is also eliminated. Side loading, as caused by torque rotational pull, has been eliminated by the sleeve seal of the present invention. The seal portions are evenly compressed throughout their diameter eliminating the pinching and decompression associated with O-rings and O-ring grooves.

A final advantage is that the seal portions of the present invention are positively interlocked, and not only fused, to the collar sections. This will ensure that the segments that define the rubber volume, and consequently the compressive force, will remain stable in use. This will permit long-term durability and integrity of the sleeve seal in the harsh operating environment of an automotive air-conditioning system.

While the present invention has been described in terms of a preferred embodiment, it is apparent that other forms could be adopted by one skilled in the art. For example, the individual seal portions may be integrated into one continuous seal portion molded in place during the seal portion molding step. Additionally, the number and shape of the seal portions could be modified to function as a dynamic seal as well as the static seal disclosed herein. Accordingly, the scope of the present invention is to be limited only by the following claims.

What is claimed is:

1. A composite sleeve seal comprising:
    a cylindrical body having an outside diameter, an inside diameter, one end portion and an opposite end portion, said cylindrical body further comprising a plurality of collar sections spaced apart from one another to define a gap between adjacent collar sections, each said collar section having a central axis coaxially aligned with each other said collar sections, said opposite end portion of said cylindrical body defining one of said plurality of collar sections having a partial tapered portion along said outside diameter of said cylindrical body, said one end portion of said cylindrical body further defining at least one collar section having said inside diameter and said outside diameter; and
    three link segments spanning said gap interconnecting each of said plurality of collar sections, said three link segments equally spaced circumferentially apart, said three link segments circumferentially defining an outermost surface smaller in diameter than said outside diameter of said cylindrical body and an innermost surface greater in diameter than said inside diameter of said cylindrical body to define at least one first annular outer groove between adjacent collar sections and at least one first annular inner groove between adjacent collar sections;
    at least one first seal mounted in said at least one first annular outer groove;
    at least one second seal mounted in said at least one first annular inner groove, and surrounding said three link segments to interlock said at least one first seal mounted in said annular outer groove and said at least one second seal mounted in said annular inner groove of said cylindrical body to form said composite sleeve seal as one integral component.

2. The composite sleeve seal as claimed in claim 1 wherein said at least one collar section is made of a plastic material and said at least one seal portion and said at least one second seal portion is made of an elastomer material.

3. The composite sleeve seal as claimed in claim 1 wherein said three link segments interconnecting each of said plurality of collar sections are spaced 120° apart about said inside and outside diameters of said cylindrical body.

4. A composite sleeve seal for sealing a conduit connection, said composite sleeve seal comprising:
    a cylindrical body having an outside diameter, an inside diameter, one end portion and an opposite end portion defining a partial tapered portion along said outside diameter of said cylindrical body, said one end portion of said cylindrical body defining a plurality of collar sections spaced apart from one another to define a gap between adjacent collar sections, said plurality of collar sections being interconnected by three link segments equally circumferentially spaced and spanning said gap to interconnect each of said plurality of collar sections;
    said three link segments circumferentially defining an outermost surface smaller in diameter than said outside diameter of said cylindrical body and an innermost surface greater in diameter than said inside diameter of said cylindrical body to define at least one first annular outer groove between adjacent collar sections and at least one second annular inner groove between adjacent collar sections;
    at least one first resilient seal member mounted in said at least one first annular outer groove; and
    at least one second resilient seal member mounted in said at least one first annular inner groove, said first and second resilient seal members further mounted contiguous each said plurality of collar sections and surrounding each of said three link segments to interlock said first resilient seal member mounted in said first annular outer groove and said second resilient seal member mounted in said first annular inner groove with said cylindrical body to form said composite sleeve as one integral component.

5. The composite sleeve seal as claimed in claim 4 wherein each of said plurality of collar sections is made from a plastic material and said first and second resilient seal members are made from an elastomer material.

6. The composite sleeve seal as claimed in claim 4 wherein said three link segments interconnecting each of said plurality of collar sections are circumferentially spaced 120° apart about said inside and outside diameters of said cylindrical body.

\* \* \* \* \*

UNITED STATES PATENT AND TRADEMARK OFFICE
CERTIFICATE OF CORRECTION

PATENT NO.      : 7,407,165 B1  
APPLICATION NO. : 09/542897  
DATED           : August 5, 2008  
INVENTOR(S)     : Jerry H. Chisnell Page 1 of 1

It is certified that error appears in the above-identified patent and that said Letters Patent is hereby corrected as shown below:

In Column 5, Line 9, kindly delete "241" and insert --24I--.

In Column 5, Line 9, kindly delete "240" and insert --24O--.

In Column 5, Line 25, kindly delete "320" and insert --32O--.

In Column 5, Line 26, kindly delete "240" and insert --24O--.

Signed and Sealed this

Eleventh Day of November, 2008

JON W. DUDAS  
*Director of the United States Patent and Trademark Office*